United States Patent [19]
Job

[11] Patent Number: 5,146,028
[45] Date of Patent: Sep. 8, 1992

[54] OLEFIN POLYMERIZATION CATALYST AND PROCESS OF POLYMERIZATION

[75] Inventor: Robert C. Job, Houston, Tex.

[73] Assignee: Shell Oil Company, Houston, Tex.

[21] Appl. No.: 833,185

[22] Filed: Feb. 10, 1992

Related U.S. Application Data

[62] Division of Ser. No. 599,610, Oct. 18, 1990, Pat. No. 5,106,806.

[51] Int. Cl.$^5$ .............................. C07C 2/30; C08F 4/02
[52] U.S. Cl. ..................................... 585/512; 526/124;
526/125; 526/127; 526/128; 526/142; 526/143;
526/351; 526/352; 585/532
[58] Field of Search ............... 585/512, 532, 124, 125,
585/127, 128, 142, 143, 351, 352

[56] References Cited

U.S. PATENT DOCUMENTS

| | | | |
|---|---|---|---|
| 4,330,649 | 5/1982 | Kioka et al. | 526/125 |
| 4,472,521 | 9/1984 | Band | 502/104 |
| 4,540,679 | 9/1985 | Arzoumanidis et al. | 502/111 |
| 4,710,428 | 12/1987 | Tamamizu et al. | 428/408 |
| 4,728,705 | 3/1988 | Nestlerode et al. | 526/125 |
| 4,814,314 | 3/1989 | Matsuura et al. | 502/112 |
| 4,829,038 | 5/1989 | Hoppin et al. | 502/125 |
| 4,902,761 | 2/1990 | Suga et al. | 526/119 |
| 5,106,806 | 4/1992 | Job | 502/111 |

*Primary Examiner*—Asok Pal

[57] ABSTRACT

Improved lower α-olefin polymerization catalysts are produced from an organoaluminum cocatalyst, a selectivity control agent and a specified magnesium-containing, titanium-containing, halide-containing procatalyst. The procatalyst is produced from an electron donor, tetravalent titanium halide and a complex alkoxide compound formed from magnesium alkoxide, titanium alkoxide and a phenolic compound. The catalyst is utilized to produce poly-α-olefin in good yield, which polymer is characterized by a relatively low xylene solubles content and a relatively high bulk density.

5 Claims, No Drawings

OLEFIN POLYMERIZATION CATALYST AND PROCESS OF POLYMERIZATION

This is a division of application Ser. No. 07/599,610, filed Oct. 18, 1990 now U.S. Pat. No. 5,106,806.

FIELD OF THE INVENTION

This invention relates to high activity olefin polymerization catalysts and to a method for the production thereof. More particularly, the invention relates to a magnesium-containing, titanium-containing precursor of an olefin polymerization catalyst component and to the catalyst component and catalyst produced therefrom.

BACKGROUND OF THE INVENTION

The production of polymers or copolymers of lower α-olefins, particularly ethylene and propylene, has gained substantial commercial significance. The polymeric products are inexpensive and exhibit a number of commercially useful properties. In the case of the polymerization of ethylene, the process is relatively uncomplicated in that the product type is not influenced by the manner in which the ethylene molecules add to the growing polymeric chain and the product does not exist in stereoisomeric forms.

In the case of the polymerization of propylene, however, the presence of pendant methyl groups on the polymeric chain provides the possiblity of several types of product depending on the steric regularity with which the propylene units add to the growing chain. Much if not most of the commercial polypropylene results from the stereoregular addition of propylene units in a regular head-to-tail manner. The propylene in which the addition of units is random is termed atactic. This amorphous form is less desirable and, if present in significant quantities, must be removed as by extraction in order to obtain a more desirable crystalline product.

Also significant from a commercial standpoint is the activity of the polymerization catalyst. A number of the early polymerization catalysts, e.g., trivalent titanium, chromium or vanadium catalysts, were of relatively low activity and the product contained significant proportions of catalyst residues. The removal of such residues as by a deashing step was required in order to obtain commercially acceptable properties.

The more recent olefin polymerization catalysts are more stereo-regulating and of sufficient catalytic activity so that extraction and/or deashing steps are not required. In the terms now conventionally employed for the components, the high activity olefin polymerization catalysts are formed from a procatalyst which typically contains magnesium, titanium and halide moieties as well as an electron donor, a cocatalyst which is usually an organoaluminum compound and a selectivity control agent which may be provided as a partial or total complex with the cocatalyst. Although each of these catalyst components has a considerable influence on the polymerization catalyst and process and the product thereby produced, the nature of the catalyst as well as the polyolefin product seem to be most influenced by the procatalyst. Much of the research toward improvement of the olefin polymerization catalyst has been directed toward improvemen of the procatalyst component.

Kioka et al, U.S. Pat. No. 4,330,649, describe a solid catalyst component (procatalyst) obtained by heating a soluble magnesium compound such as magnesium chloride with a higher alcohol in the presence of an ester to produce a solution which is added to titanium tetrachloride and an electron donor to form the procatalyst. Band, U.S. Pat. No. 4,472,521, reacts a magnesium alkoxide with a titanium alkoxide of 4 or more carbon atoms in each alkoxide in the presence of aromatic hydrocarbon. Titanium tetrachloride and an electron donor are added to the resulting solution to produce a solid procatalyst which is post-treated with transition metal halide. Arzoumanides, U.S. Pat. No. 4,540,679, produces a catalyst component by contacting a suspension of magnesium ethoxide in ethanol with carbon dioxide. The addition of an organoaluminum compound in a hydrocarbon to the resulting solution produces granular particles which are employed as a support for titanium upon treatment with titanium tetrachloride. Nestlerode et al, U.S. Pat. No. 4,728,705, solubilize magnesium ethoxide in ethanol with carbon dioxide and spray dry the resulting solution or alternatively use the solution to impregnate catalyst support particles. The particles resulting from either modification are useful in the production of a procatalyst of desirable morphology.

A somewhat different type of catalyst component precursor is described by Job, U.S. Pat. No. 4,710,428, wherein a magnesium compound of the general formula $$Mg_4(OR)_6(ROH)_{10}A \qquad (I)$$

is formed wherein R independently is lower alkyl of up to 4 carbon atoms inclusive and A is one or more anions having a total oxidation state of $-2$. This complex magnesium compound is contacted with a tetravalent titanium halide, a halohydrocarbon and an electron donor to form the procatalyst. The use of such magnesium compounds has certain advantages in that they are crystalline materials of desirable morphology whereas magnesium ethoxide is not. The conversion of the crystals of such magnesium compounds to olefin polymerization procatalysts is by conventional technology. The catalysts produced from such procatalysts are good high activity olefin polymerization catalysts, particularly for the polymerization or copolymerization of propylene. It would be of advantage, however, to provide improved olefin polymerization catalysts.

SUMMARY OF THE INVENTION

The present invention provides complex magnesium-containing, titanium-containing alkoxide compounds which are useful as precursors of a component of high activity olefin polymerization catalysts. More particularly, the invention provides such complex alkoxide compounds, as well as the catalyst components and the polymerization catalysts produced therefrom. The invention also relates to a process for polymerizing olefins in the presence of such catalysts to produce polyolefin product of good properties in improved yield.

DESCRIPTION OF THE INVENTION

The present invention contemplates the formation of a complex magnesium-containing, titanium-containing alkoxide compound which is useful in the production of the procatalyst component of a high activity olefin polymerization catalyst. Such complex alkoxide compounds are produced by contacting a magnesium alkoxide, a titanium-alkoxide and a phenolic compound. Solutions of the complex alkoxide compound are contacted with a tetravalent titanium halide, an optional halohydrocarbon and an electron donor to form a solid olefin polymerization procatalyst. The procatalyst is in turn contacted with an organoaluminum cocatalyst and a selectivity control agent to produce the high activity olefin polymerization catalyst.

The complex alkoxide compounds of the invention are produced from magnesium alkoxide and titanium alkoxide wherein, in each of which, the alkoxide moiety has up to 4 carbon atoms inclusive. The alkoxide moieties within each reactant are the same or are different and the alkoxide moieties of one metal alkoxide are the same or are different from those of the other metal alkoxide. Although alkoxide groups such as methoxide, ethoxide, i-propoxide, n-butoxide and i-butoxide are useful, the preferred alkoxide groups of the complex alkoxide compound are ethoxide. In part for reasons of complex alkoxide compound purity and for ease of handling it is preferred that the alkoxide moieties of both the magnesium alkoxide and the titanium alkoxide all be ethoxide. The phenolic compound, characterized herein as producing an anion group X, is selected from phenol or activating group-substituted phenol whose phenolic hydroxyl group is free from steric hindrance. By the term "activating group" is meant a ring carbon atom substituent free from active hydrogens. Preferred activating groups are alkyl of up to 5 carbon atoms inclusive, e.g., methyl, ethyl, propyl or butyl; alkoxy of up to 5 carbon atoms inclusive, e.g., methoxy, ethoxy or amyloxy; halo, particularly chloro; and dialkylamino wherein each alkyl has up to 5 carbon atoms inclusive such as dimethylamino. Illustrative of phenolic compounds whose anions are suitable X groups are phenol, o-cresol, p-cresol, 3-methoxyphenol, 4-dimethylaminophenol, 2,6-dimethylphenol and mixtures thereof as well as mixtures with more sterically hindered phenols such as 2,6-di-t-butyl-4-methylphenol. Of such phenolic compounds o-cresol is preferred and the preferred X anion is the o-cresylate anion.

The complex alkoxide compounds are produced by contacting the metal alkoxide reactants and the phenolic compound in an inert diluent at an elevated temperature. The stoichiometry of the complex alkoxide compound is complex, but the complex alkoxide compounds are illustrated by the formula

wherein R and X have the previously stated meanings, m has a value greater than or equal to 0.5 and equal or less than 2, p has a value greater than zero but equal to or less than 2 and n has a value of $(6+4m-p)$. A preferred embodiment of the complex alkoxide compound is illustrated by the formula

wherein R and X have the previously stated meaning. The inert diluent is preferably a hydrocarbon such as isopentane, isooctane, cyclohexane, toluene or even a kerosene fraction, or is a halohydrocarbon such as methylene chloride or chlorobenzene.

The contact of the precursors of the complex alkoxide compound takes place at an elevated temperature and a pressure sufficient to maintain the reaction mixture in a non-gaseous state. Suitable temperatures for such contacting are from about 50° C. to about 110° C. The contacting is conducted in a suitable reactor and contact is facilitated by conventional techniques such as shaking, stirring or refluxing. The stoichiometry of the contacting is not simple but sufficient magnesium alkoxide is provided so that the resulting solution of complex alkoxide compound has from about 1% by weight to about 6% by weight of magnesium. The formation of the complex alkoxide compound is illustrated by the following partial equation which employs the preferred metal ethoxides.

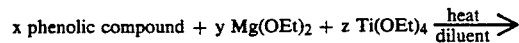

wherein the relative quantities of reactants are such that x is a number from 0 to about 2, y is a number from about 3 to about 4.5 and z is a number from about 0.5 to about 1.5. The complex alkoxide compound product mixture which results is a solution whose viscosity varies from "runny" to viscous depending upon the particular diluent employed and the quantity thereof as well as the ratio of starting materials employed.

The magnesium-containing, titanium-containing complex alkoxide compound is the precursor of a solid olefin polymerization procatalyst obtained by contacting the complex alkoxide compound with a tetravalent titanium halide, an optional halohydrocarbon and an electron donor. The tetravalent titanium halide is suitably an aryloxy- or alkoxy- di- or tri-halide such as diethoxytitanium dichloride, dihexyloxytitanium dibromide, isopropoxytitanium trichloride and phenoxytitanium trichloride, or the tetravalent titanium halide is a titanium tetrahalide such as titanium tetrachloride or titanium tetrabromide. A titanium tetrahalide is preferred as the tetravalent titanium halide and particularly preferred is titanium tetrachloride.

The optional halohydrocarbon employed in the production of the olefin polymerization procatalyst is an inert halohydrocarbon of up to 12 carbon atoms inclusive. Exemplary aliphatic halohydrocarbons include methylene chloride, methylene bromide, chloroform, carbon tetrachloride, 1,2-dibromoethane, 1,1,3-trichloropropane, 1,1,2-trichloroethane, trichlorocyclohexane, dichlorofluoromethane and tetrachlorooctane. Aromatic halohydrocarbons suitably employed include chlorobenzene, bromobenzene, dichlorobenzene and chlorotolune. Of the aliphatic halohydrocarbons, carbon tetrachloride and 1,1,2-trichloroethane are preferred but particularly preferred is the aromatic halohydrocarbon chlorobenzene.

The electron donors which are suitably employed in procatalyst production are the generally conventional electron donors free from active hydrogens which are employed in olefin polymerization catalysts based on titanium including ethers, esters, ketones, amines, amides, imines, nitriles, phosphines, stibines and arsines. The preferred electron donors are esters, particularly alkyl esters of aromatic monocarboxylic and dicarboxylic acids. Examples of such electron donors include methyl benzoate, ethyl benzoate, ethyl p-ethoxybenzoate, ethyl p-methylbenzoate, diethyl phthlate, dimethyl naphthalenedicarboxylate, diisobutyl phthlate and diisopropyl terephthlate. The electron donor is a single compound or a mixture of two or more compounds but preferably the electron donor is a single compound. Of the preferred ester electron donors, ethyl benzoate and diisobutyl phthlate are particularly preferred.

The precise manner in which the procatalyst precursors are contacted is material but not critical and is generally according to known procedures. In one embodiment, the tetravalent titanium halide is added to a mixture of the electron donor and the complex alkoxide compound. Best results, however, are obtained if the electron donor is added to the complex alkoxide compound and the resulting mixture is added to a portion of the tetravalent titanium halide. Other precedures are also suitable but are less preferred. The solid product which results is washed at least once with halohydrocarbon and with tetravalent titanium halide, employed together or separately. It is often useful to include an acid halide, e.g., benzoyl chloride or phthaloyl chloride, in at least one tetravalent titanium halide/halohydrocarbon wash as is known in the art. The solid procatalyst which results is typically washed with a light hydrocarbon such as isopentane or isooctane to remove soluble titanium compounds.

In the preferred modification, the initial contacting of the electron donor and the complex alkoxide compound is conducted at a temperature from about ambient temperature to about 150° C. Better interaction of these materials is obtained if they are heated after mixing at ambient temperature. Sufficient tetravalent titanium halide is used, in combination with any acid halide provided, to convert at least a substantial proportion of the alkoxide moieties of the complex alkoxide compound to halide moieties. This conversion, conventionally referred to as halogenation, is conducted in one or more steps, each of which is conducted over a period of time ranging from several minutes to several hours. During each contacting with tetravalent titanium halide halohydrocarbon, optionally, is also present. Sufficient electron donor is provided so that the molar ratio of electron donor to the magnesium present in the procatalyst precursor is from about 0.01 to about 10, preferably from about 0.06 to about 0.4. The final washing with light hydrocarbon and subsequent drying produces a procatalyst that is solid and granular and is storage stable provided that oxygen and active hydrocarbon compounds are excluded. Alternatively, the procatalyst is used as obtained from the hydrocarbon washing without the need for drying. The procatalyst so obtained is used in the production of an olefin polymerization catalyst by contact with cocatalyst and selectivity control agent.

The cocatalyst component of the olefin polymerization catalyst is an organoaluminum compound selected from the cocatalysts conventionally employed in conjunction with titanium-based procatalysts. Illustrative organoaluminum cocatalysts are trialkylaluminum compounds, alkylaluminum alkoxide compounds and alkylaluminum halide compounds and alkylaluminum halide compounds wherein each alkyl independently has from 2 to 6 carbon atoms inclusive. The preferred organoaluminum compounds are free of halogen and particularly preferred are trialkylaluminum compounds such as triethylaluminum, triisopropylaluminum, triisobutylaluminum and diethylhexylaluminum. Triethylaluminum is a preferred trialkylaluminum. The organoaluminum cocatalyst, during formation of the olefin polymerization catalyst, is employed in a molar ratio of aluminum to titanium of the procatalyst from about 1:1 to about 150:1, but preferably in a molar ratio of from about 10:1 to about 100:1.

The selectivity control agents which are utilized in the production of olefin polymerization catalyst are those selectivity control agents conventionally provided in conjunction with titanium-based procatalysts and organoaluminum cocatalysts. Illustrative of suitable selectivity control agents are those classes of electron donors employed in procatalyst production as described above as well as organosilane compounds including alkylalkoxysilanes and arylalkoxysilanes of the formula $$R'_r Si(OR)_{4-r} \tag{III}$$

wherein $R'$ independently is alkyl or aryl of up to 10 carbon atoms inclusive, R independently is alkyl of up to 4 carbon atoms inclusive and r is 1 or 2. The preferred selectivity control agents are esters of aromatic mono- and dicarboxylic acids such as ethyl p-ethoxybenzoate, diisobutyl phthalate, ethyl benzoate and ethyl p-methylbenzoate or the preferred selectivity control agents are alkylalkoxysilanes such as diethyldiethoxysilane, diisobutyldimethoxysilane, propyltrimethoxysilane or cyclohexylmethyldimethoxysilane. In one modification, the selectivity control agent is the electron donor added with the tetravalent titanium halide/halohydrocarbon washes. In an alternate modification the selectivity control agent is provided at the time of the contacting of procatalyst and cocatalyst. In either embodiment of the production of the olefin polymerization catalyst the selectivity control agent is provided in a quantity of from about 0.01 mole to about 100 moles per mole of titanium of the procatalyst. Preferred quantities of selectivity control agent are from about 0.5 mole to about 20 mole per mole of titanium of the procatalyst.

The olefin polymerization catalyst is produced by known procedures of contacting the procatalyst, the cocatalyst and the selectivity control agent. The method of contacting is not material. In one modification the catalyst components are simply mixed in a suitable reactor and the preformed catalyst thereby produced is introduced into the polymerization system. In an alternate modification, the catalyst components are introduced into the polymerization reactor where the catalyst is formed in situ.

The olefin polymerization catalyst formed from the complex alkoxide compound by way of the procatalyst is useful in the polymerization under polymerization conditions of lower α-olefins and particularly in the polymerization of straight-chain α-olefins of up to 4 carbon atoms inclusive, i.e., ethylene, propylene and 1-butene, or mixtures thereof. The precise procedures and conditions of the polymerization are broadly conventional but the olefin polymerization process, by virtue of the use therein of the polymerization catalyst formed from the complex alkoxide compound precursor, provides polyolefin product and particularly polypropylene product having a relatively high bulk density in quantities which reflect the relatively high productivity of the olefin polymerization catalyst. The polymerization product is suitably a homopolymer such as polyethylene or polypropylene, particularly polypropylene, when a single α-olefin is supplied to the polymerization process. Alternatively, the catalyst and process of the invention is useful in the production of copolymers including copolymers of propylene and ethylene such as EPR and polypropylene impact copolymer as when two or even more α-olefin monomers are supplied to the polymerization process.

Polymerization is suitably conducted in a gas-phase process employing one or more fluidized beds of catalyst or is conducted as a slurry-phase process incorporating as diluent an inert material such as propane or a liquified monomer of the polymerization such as propylene. The molecular weight of the polymer product is typically influenced by the provision of molecular hydrogen to the polymerization system as is known in the art. The polymerization process is conducted in a batchwise manner or in a semi-continuous or continuous manner with constant or intermittent addition of the catalyst or catalyst components to the polymerization reactor.

In general, the productivity of an olefin polymerization catalyst exhibits an inverse relationship with selectivity so that many highly active polymerization catalysts have a good productivity but a relatively low stereospecificity. The catalysts of the invention exhibit good productivity while retaining desirably high stereospecificity so that the polymer product obtained by the use of such catalyst has good properties without the necessity for an extraction or a deashing step.

The invention is further illustrated by the following Illustrative Embodiments which should not be regarded as limiting. In the Illustrative Embodiments, the productivity of the catalyst is determined as kg of polymer product/g of procatalyst obtained in a standard batch, slurry-phase polymerization of 1 hour, or alternatively the productivity is expressed in kg of polymer product/g Ti as determined in similar fashion. The stereospecificity of the catalyst and specifically the selectivity to isotactic product is determined by measuring the amount of xylene soluble polymer (termed XS) at ambient temperature in accordance with regulations of the U.S. Food and Drug Administration. The test for xylene solubles is conducted by dissolving the polymer sample in xylene under reflux. The flask containing dissolved polymer is then immersed in a water bath at 25° C. and maintained without stirring for 1 hour, during which the insoluble portion precipitates. The precipitate is removed by filtration and the solubles content of the filtrate is determined by evaporation of an aliquot followed by drying and weighing of the residue. The xylene solubles consist primarily of amorphous (atactic) polymer and a small amount of low molecular weight crystalline polymer.

ILLUSTRATIVE EMBODIMENT I

A number of olefin polymerization procatalyst precursors were prepared by contacting magnesium ethoxide, titanium tetraethoxide and o-cresol in varying proportions in various solvents and the resulting mixtures were heated at temperatures from about 50° C. to about 110° C. By way of illustration, in a 1 liter, 3-neck flask equipped with a reflux condenser, 116 g (1.01 mole) of magnesium ethoxide, 81.2 g (0.34 mole) of titanium (IV) ethoxide and 73 g (0.67 mole) of o-cresol were slurried in 276 g of isooctane. After stirring for over 1 hour at 85° C., a clear yellow, relatively non-viscous solution was obtained. This solution contained 4.5% Mg by weight. The molar ratio of cresol/magnesium/titanium was 2/3/1. Clear solutions of similar concentrations in isooctane, chlorobenzene, cyclohexane, isopentane, tetraethylorthosilicate methylene chloride, silicone soil, kerosene, toluene and ethylbenzene were prepared in a similar manner using various molar ratios of o-cresol, magnesium ethoxide and titanium ethoxide. In the Table I which follows, the molar proportions of starting materials are provided and the viscosity of several product solutions is qualitatively estimated between 1 and 5 with 1 representing a viscosity similar to water and 5 representing a viscosity similar to jelly where heating is required before the solution will easily flow. The one or more solvents employed is also listed with CB representing chlorobenzene, iC8 representing isooctane, CH representing cyclohexane and DCM representing dichloromethane.

TABLE I

| o-cresol | Mg(OEt)$_2$ | Ti(OEt)$_4$ | Solvent | Viscosity |
|---|---|---|---|---|
| 0.5 | 3 | 1.75 | CB, CH | 1 |
| 0.5 | 3 | 1 | CB, CH | 5 |
| 0.75 | 3 | 1 | CB | 4 |
| 1 | 3 | 1 | CB | 2 |
| 1 | 3 | 1.5 | CB, iC8 | 1 |
| 2 | 3 | 0.5 | iC8 | 2 |
| 2 | 3 | 1 | CB | 2 |
| 2 | 4 | 1 | iC8, DCM | 3 |
| 2 | 4.5 | 1 | CB | 5 |

ILLUSTRATIVE EMBODIMENT II

Using the complex alkoxide compound solutions prepared according to the procedure of Illustrative Embodiment I, olefin polymerization procatalysts were produced. To produce the procatalysts, sufficient solution to provide from 30 mmol to 50 mmol of magnesium was mixed into titanium tetrachloride (150 ml) then digested for 60 minutes at 110° C. with diisobutyl phthalate present at a concentration of about 40 mmol/liter. This was followed by a 30 minute wash at 110° C. with 150 ml of a 50/50 by volume mixture of chlorobenzene and titanium tetrachloride solution containing 6 mmol/liter of phthaloyl chloride. A second 30 minute wash at 110° C. with the 50/50 by volume mixture of chlorobenzene and titanium chloride was then conducted. The resulting solid was then washed one time with isooctane at 90° C. and twice with isooctane at room temperature. The product was then dried in a nitrogen stream at 50° C.

In these preparations, several methods of mixing the complex alkoxide compound solutions of Illustrative Embodiment I with the diisobutyl phthalate and the mixture containing titanium tetrachloride were used. These methods are described as follows.
  A. The diisobutyl phthalate was added to the complex alkoxide compound solution and the resulting mixture was added dropwise to 150 ml of the titanium tetrachloride digestion solvent at room temperature. The slurry which resulted was heated to 110° C. after 20 minutes then held for one hour, while stirring.
  B. Same as A except that the mixture of diisobutyl phthalate and the compound of Illustrative Embodiment I solution was held overnight at room temperature before being added to the titanium tetrachloride digestion solvent.
  C. Same as A except that the solution containing titanium tetrachloride was added dropwise to the mixture consisting of diisobutyl phthalate and the solution of Illustrative Embodiment I.

ILLUSTRATIVE EMBODIMENT III

Each of the olefin polymerization procatalysts of Illustrative Embodiment II was converted to an olefin polymerization catalyst by contacting with triethylaluminum and diisobutyldimethoxysilane. These catalysts were then used to polymerize propylene in a conventional slurry-phase reaction using liquid propylene as diluent. The results of these polymerizations are shown in Table II along with the results from a similar polymerization using a catalyst prepared from solid magnesium ethoxide rather than a solution produced according to Illustrative Embodiment I. In Table II, the heading "Ratio" identifies the molar ratio of o-cresol, magnesium ethoxide and titanium tetraethoxide and the solvent used to produce the starting complex alkoxide compound solution (Illustrative Embodiment I). The term "Procedure" identifies the method used to produce the procatalyst (Illustrative Embodiment II), "% Ti" indicates the percent by weight of titanium in the procatalyst, "Yield" is the kg of polymer product produced per g of procatalyst in a one-hour polymerization in liquid propylene at 67° C. with the triethylaluminum cocatalyst and diisobutyldimethoxysilane as selectivity control agent, "XS" represents the xylene soluble content in percent of the polypropylene product and "BD" is the non-packed bulk density of that product in gm/cc.

TABLE 11

| Run No. | Ratio | Procedure | % Ti | Yield | XS | BD |
|---|---|---|---|---|---|---|
| — | Mg(OEt)$_2$ | — | 2.28 | 26.6 | 2.7 | 0.33 |
| 1 | 1/3/1.5 CB | C | 1.89 | 7.4 | 4.5 | 0.407 |
| 2 | 1/3/1.5 CB | A | 3.43 | 38.8 | 5.0 | 0.335 |
| 3 | 1/3/1.5 iC8 | A | 3.13 | 26.5 | 4.1 | 0.347 |
| 4 | 2/3/1 CB | A | 2.66 | 22.5 | 4.4 | 0.358 |
| 5 | 2/4.5/1 CB | B | 3.32 | 20.3 | 3.9 | 0.338 |
| 6 | 0.5/3/1 CB | B | 2.24 | 30.8 | 2.1 | 0.434 |
| 7 | 1/3/1 CB | B | 2.69 | 30.4 | 3.4 | 0.405 |
| 8 | 0.5/3/1.5 CB | A | 3.39 | 41.2 | 4.4 | 0.368 |

What is claimed is:

1. A process of producing a lower α-olefin polymer which comprises contacting under polymerization conditions one or more lower α-olefins with an olefin polymerization catalyst obtained by contacting (A) a catalyst component obtained by contacting a magnesium dialkoxide wherein each alkoxide independently has up to 4 carbon atoms conclusive, titanium tetraalkoxide wherein each alkoxide independently has up to 4 carbon atoms inclusive, and a phenolic compound selected from phenol and activating group-substituted phenol, at elevated temperature, with a tetravalent titanium halide and an electron donor, with (B) an organoaluminum cocatalyst and (c) a selectivity control agent.

2. The process of claim 1 wherein the α-olefin is propylene or mixtures thereof with ethylene.

3. The process of claim 2 wherein the α-olefin is propylene.

4. The process of claim 1 wherein the polymerization is conducted in slurry-phase in liquid diluent.

5. The process of claim 4 wherein the polymerization is conducted as gas-phase.

* * * * *